Nov. 25, 1941.  N. G. A. MALMQUIST  2,263,884
RESILIENT WHEEL
Filed July 1, 1938
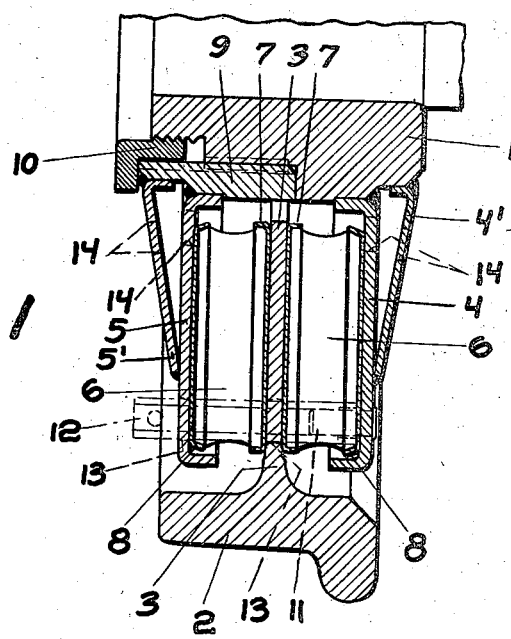
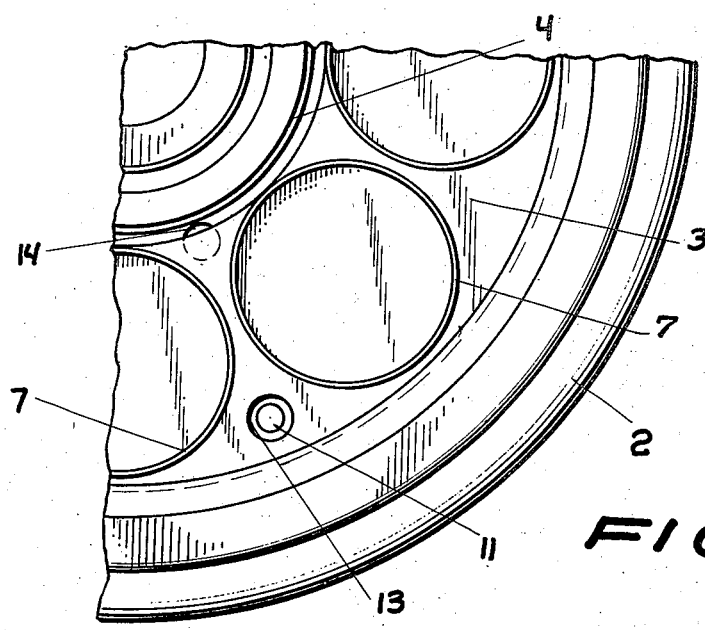

Patented Nov. 25, 1941

2,263,884

UNITED STATES PATENT OFFICE 2,263,884

RESILIENT WHEEL

Nils Gunnar August Malmquist, Malmo, Sweden, assignor to Svenska Aktiebolaget Bromsregulator, Malmo, Sweden, a corporation of Sweden Application July 1, 1938, Serial No. 217,009

4 Claims. (Cl. 295—11)

This invention relates to resilient wheels, especially street and railway car wheels, of the kind in which a plurality of flexible rubber blocks are disposed between axially spaced overlapping flanges on the hub and rim members of the wheel and have their ends seated in normally coaxial substantially shallow cavities provided on the facing sides of said flanges. A resilient wheel of this kind is described and shown in my U. S. Patent No. 2,086,720.

It is the object of this invention to supply a resilient wheel construction of this kind which is practical, commercial and economical.

A specific object of the invention is to provide a construction in which the overlapping flanges on the hub member of the wheel are in the form of plates for instance of sheet steel of a relatively small thickness.

Another object of the invention is to provide a construction in which the cavities in which the ends of the rubber blocks are seated are formed by securing shallow cups of pressed sheet steel or like material on the facing sides of the flanges on the hub and rim members.

These and other objects and advantages will become hereinafter more fully apparent as reference is had to the accompanying drawing in which:

Fig. 1 is an axial section through a part of a resilient wheel embodying my invention;

Fig. 2 is a partial side view of the wheel with one of the hub flanges and the adjacent row of rubber blocks removed.

The wheel comprises the hub 1 and the rim 2 which is provided with an inwardly directed flange 3. The hub 1 is provided with outwardly directed flanges 4 and 5 disposed on both sides of the rim flange 3 and axially spaced in relation thereto. A plurality of rubber blocks 6 are provided between the rim flange 3 and the hub flanges 4 and 5.

The hub flanges 4 and 5 are in the form of annular plates of sheet steel or like material of relatively small thickness, and also the rim flange 3 is in the form of a plate member. On both sides of the rim flange 3 and on the facing sides of the hub flanges 4 and 5 there are secured normally coaxial substantially shallow cups 7 and 8 of pressed sheet steel or like material in which the ends of the rubber blocks 6 are seated. The cups 7 and 8 may be secured in place by rivets or the like but preferably they are secured by electric spot welding to the flanges 3, 4 and 5. On the outer sides of the hub flanges 4 and 5 there are provided conical thrust plates 4' and 5', respectively, and these annular thrust plates are welded at their outer edges to the flanges 4 and 5. The flange 4 and its thrust plate 4' are fixedly secured directly to the hub 1 preferably by welding, and the flange 5 and its thrust plate 5' are fixedly secured in the same manner on a sleeve 9 which is splined on to the hub 1 and secured in place by means of a nut 10 on the end of the hub so that the sleeve 9 and thereby the flange 5 is removable for making possible assembling and dismantling of the wheel. With this construction the stay bolts shown in my U. S. Patent No. 2,086,720 for holding the hub flanges on their predetermined axial distance can be dispensed with.

By providing the cavities for receiving the ends of the rubber blocks 6 in the form of cups secured on the facing sides of the flanges 3, 4 and 5 instead of providing these cavities in the form of recesses in the material of the flanges brings the advantage that the flanges can be constructed with a materially smaller thickness without sacrificing anything of their strength. Also the cost of manufacture of the wheels may be reduced in this manner.

The cavities of the cups 7 and 8 and the end portions of the rubber blocks 6 seated in the cups substantially conform to each other, and the rubber blocks are under a substantial axial compression in the assembled wheel as described in my U. S. Patent No. 2,086,720. Preferably the cavities of the cups 7 on both sides of the rim flange 3 and the end portions of the rubber blocks 6 seated in the cups 7 are substantially cylindrical, while the cavities of the cups 8 secured on the facing sides of the hub flanges 4 and 5 taper towards the bottom of the cups in order to facilitate assembling of the wheel in the manner described in my U. S. Patent 2,220,417. On the fixedly secured hub flange 4 there are provided a number of pegs 11 on which a corresponding number of preferably tubular mounting members 12 are adapted to be pushed or screwed on, in order to serve as guiding means for the rim flange 3 and the removable hub flange 5 when the wheel is to be assembled, the rim flange 3 and the hub flange 5 being provided with holes 13 for the said mounting members one of which is indicated in dash and dot lines in Fig. 1. After assembling of the wheel the mounting tubes 12 may be removed.

The hub flanges 4 and 5 and their thrust plates 4' and 5' are provided with ventilating holes 14 near the hub 1 so that air for cooling purposes may flow into the wheel through these ventilating holes and leave the wheel near the rim, passing the rubber blocks 6 on the way outwardly to the rim and thereby cooling the rubber blocks. This circulation of air through the wheel is effected automatically when the wheel is running, the rotating wheel then acting as a centrifugal fan with the rubber blocks for fan blades.

What I claim and desire to secure by Letters Patent is:

1. A resilient wheel construction comprising a hub member and a rim member, axially spaced overlapping flanges on said members, normally coaxial shallow cups on the exterior surfaces of the facing sides of said flanges, a plurality of flexible rubber blocks disposed between said flanges and having end portions substantially conforming to the cavities of said cups and seated therein, thrust plates disposed on the outer sides of the hub plate flanges and said thrust plates being provided with ventilating holes.

2. A resilient wheel construction comprising a hub member and a rim member, axially spaced overlapping flanges on said members, normally coaxial shallow cups on the exterior surfaces of the facing sides of said flanges, a plurality of flexible rubber blocks disposed between said flanges and having end portions substantially conforming to the cavities of said cups and seated therein, thrust plates disposed on the outer sides of the hub plate flanges and said hub flanges being provided with ventilating holes.

3. A resilient wheel construction comprising a hub member and a rim member, an inwardly directed plate flange on said rim member, outwardly directed plate flanges on said hub member disposed on both sides of the plate flange on the rim member and axially spaced in relation thereto, normally coaxial substantially shallow cups of pressed sheet metal fixedly secured on the exterior surfaces of the facing sides of said plate flanges, a plurality of flexible rubber blocks disposed between said flanges and having end portions substantially conforming to the cavities of said cups and seated therein, the cavities of the pressed cups secured on both sides of the inwardly directed plate flange on the rim member being substantially cylindrical and the cavities of the pressed cups secured on the facing sides of the outwardly directed plate flanges on the hub member tapering towards the bottom of the cups.

4. A resilient wheel construction comprising a hub member and a rim member, an inwardly directed plate flange on said rim member, outwardly directed plate flanges on said hub member disposed on both sides of the plate flange on the rim member and axially spaced in relation thereto, normally coaxial substantially shallow cups of pressed sheet metal fixedly secured on the exterior surfaces of the facing sides of said plate flanges, a plurality of flexible rubber blocks disposed between said flanges and having end portions substantially conforming to the cavities of said cups and seated therein, annular, conical thrust plates disposed on the outer sides of the hub plate flanges, and said thrust plates as well as the hub plate flanges being provided with ventilating holes near the hub.

NILS GUNNAR AUGUST MALMQUIST.